United States Patent
Napper et al.

(10) Patent No.: US 11,163,435 B2
(45) Date of Patent: Nov. 2, 2021

(54) SYSTEMS AND METHODS FOR COMPUTERIZED GENERATION OF USER INTERFACE SYSTEMS

(71) Applicant: TD Ameritrade IP Company, Inc., Omaha, NE (US)

(72) Inventors: Harrison W. Napper, Chicago, IL (US); Nathaniel Philippe Lizardo, Chicago, IL (US); Jordan David Dravis, Chicago, IL (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 16/803,789

(22) Filed: Feb. 27, 2020

(65) Prior Publication Data

US 2021/0103384 A1 Apr. 8, 2021

Related U.S. Application Data

(60) Provisional application No. 62/911,356, filed on Oct. 6, 2019.

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 16/245* (2019.01); *G06Q 40/06* (2013.01); *G06T 11/206* (2013.01); *G06T 2200/24* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 2006/0047590 A1* | 3/2006 | Anderson | G06Q 40/00 705/35 |
| 2006/0059065 A1* | 3/2006 | Glinberg | G06Q 40/08 705/35 |

(Continued)

FOREIGN PATENT DOCUMENTS

JP  2007299181 A  11/2007

OTHER PUBLICATIONS

International Search Report and Written Opinion for PCT Application No. PCT/162020/058497; dated Dec. 18, 2020; 8 pages.

*Primary Examiner* — Nicholas Augustine
(74) *Attorney, Agent, or Firm* — Harness, Dickey & Pierce, P.L.C.

(57) ABSTRACT

A system includes instructions for execution by at least one processor. The instructions include, in response to receiving user input for a result graph request, determining a horizontal axis range and a vertical axis range. The instructions include obtaining and storing option data corresponding to an option for a stock identifier, receiving a first location of a movable user interface element, identifying a first strike price based on the first location of the movable user interface element, and obtaining a first option based on the first strike price. The instructions include determining a result value of the first option based on a projected price of the first option. The instructions include plotting, on a result graph, the result value for each integer of the horizontal axis range. The instructions include, in response to the movable user interface element being moved to a second location, updating the result graph.

18 Claims, 9 Drawing Sheets

(51) Int. Cl.
  *G06Q 40/06* (2012.01)
  *G06T 11/20* (2006.01)
  *G06F 16/245* (2019.01)
  *G06F 3/01* (2006.01)

(56) References Cited

U.S. PATENT DOCUMENTS

| | | | |
|---|---|---|---|
| 2006/0259394 A1* | 11/2006 | Cushing | G06Q 40/06 705/37 |
| 2009/0106133 A1* | 4/2009 | Redmayne | G06Q 40/00 705/35 |
| 2011/0231338 A1 | 9/2011 | Cooper et al. | |
| 2013/0024173 A1* | 1/2013 | Brzezicki | G06F 30/20 703/6 |
| 2013/0218742 A1 | 8/2013 | Gershon | |
| 2015/0095260 A1 | 4/2015 | Ma et al. | |
| 2017/0300933 A1* | 10/2017 | Mascaro | G06N 7/005 |
| 2019/0197625 A1 | 6/2019 | Reiter | |

* cited by examiner

SYSTEMS AND METHODS FOR COMPUTERIZED GENERATION OF USER INTERFACE SYSTEMS

CROSS-REFERENCE TO RELATED APPLICATIONS

This application claims the benefit of U.S. Provisional Application No. 62/911,356, filed Oct. 6, 2019. The entire disclosure of the application referenced above is incorporated by reference.

FIELD

The present disclosure relates to systems and methods for computerized generation of graphics displays and more particularly to systems and methods for user-adjustable features of computerized graphics displays.

BACKGROUND

Options trading can be intimidating and complicated. Users can better understand risks involved in options trading by viewing a results graph depicting profit and loss of a potential options purchase. When viewing result graphs, a user may zoom in and out to analyze different aspects of the graph. This process is traditionally computationally expensive. Additionally, changing a strike price to view a different option purchase requires the generation of a different result graph, which is also computationally expensive.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a pre-loaded database including option data for a range of strike prices and instructions for execution by the at least one processor. The instructions include, in response to receiving user input for a result graph request including a stock identifier and an option identifier from a user device, determining a horizontal axis range and a vertical axis range based on the stock identifier and the option identifier. The instructions include, for each integer within the horizontal axis range, obtaining and storing option data corresponding to an option for the stock identifier in the pre-loaded database that has a strike price set to the corresponding integer. The instructions include receiving a first location of a movable user interface element.

The first location of the movable user interface element corresponds to a point along the horizontal axis range. The instructions include identifying a first strike price based on the first location of the movable user interface element and obtaining, from the pre-loaded database, a first option based on the first strike price. The instructions include, for each integer of the horizontal axis range, determining a result value of the first option based on a projected price of the first option at which a value of a stock corresponding to the stock identifier equals the corresponding integer. The instructions include plotting, on a result graph, the result value for each integer of the horizontal axis range. The instructions include, in response to the movable user interface element being moved to a second location, updating the result graph by performing the receiving, identifying, obtaining, determining, and plotting steps based on the second location.

In other features, the result value is the projected price of the first option at which the value of the stock corresponding to the stock identifier equals the corresponding integer less an original price of the first option. In other features, the determining the horizontal axis range includes identifying a highest strike price of the first option, identifying a lowest strike price of the first option, calculating a buffer value, and setting the horizontal axis range to the lowest strike price less the buffer value and the highest strike price plus the buffer value. In other features, the buffer value is equal to ten percent of the identified highest strike price of the first option less the identified lowest strike price of the first option.

In other features, the identifying the highest strike price of the first option includes determining a standard deviation upward move of the strike price of the first option and, in response to the standard deviation upward move of the strike price being higher than the highest strike price, selecting the standard deviation upward move of the strike price as the highest strike price. In other features, the identifying the highest strike price of the first option includes determining a standard deviation downward move of the strike price of the first option and, in response to the standard deviation downward move of the strike price being lower than the lowest strike price, selecting the standard deviation downward move of the strike price as the lowest strike price.

In other features, the determining the vertical axis range includes identifying a highest value of the projected price of the first option, identifying a lowest value of the projected price of the first option, and setting the vertical axis range to the identified lowest value less the buffer value and the identified highest value plus the buffer value. In other features, the memory stores a stock and option parameter database including a plurality of options and each option of the plurality of options includes a corresponding stock symbol, a value, and an expiration date. In other features, the instructions include obtaining the option data corresponding to the option from the stock and option parameter database. In other features, the pre-loaded database is updated in response to the horizontal axis range being determined.

A method includes receiving user input for a result graph request including a stock identifier and an option identifier from a user device. The method includes determining a horizontal axis range and a vertical axis range based on the stock identifier and the option identifier. The method includes, for each integer within the horizontal axis range, obtaining and storing option data corresponding to an option for the stock identifier in a pre-loaded database that has a strike price set to the corresponding integer. The pre-loaded database includes option data for a range of strike prices. The method includes receiving a first location of a movable user interface element. The first location of the movable user interface element corresponds to a point along the horizontal axis range. The method includes identifying a first strike price based on the first location of the movable user interface element. The method includes obtaining, from the pre-loaded database, a first option based on the first strike price. The method includes, for each integer of the horizontal axis range, determining a result value of the first option based on a projected price of the first option at which a value of a stock corresponding to the stock identifier equals the corresponding integer. The method includes plotting, on a result graph, the result value for each integer of the horizontal axis range. The method includes, in response to the movable user interface element being moved to a second location, updating the result graph by performing the receiving, identifying, obtaining, determining, and plotting steps based on the second location.

In other features, the result value is the projected price of the first option at which the value of the stock corresponding to the stock identifier equals the corresponding integer less an original price of the first option. In other features, the determining the horizontal axis range includes identifying a highest strike price of the first option, identifying a lowest strike price of the first option, calculating a buffer value, and setting the horizontal axis range to the lowest strike price less the buffer value and the highest strike price plus the buffer value. In other features, the buffer value is equal to ten percent of the identified highest strike price of the first option less the identified lowest strike price of the first option.

In other features, the identifying the highest strike price of the first option includes determining a standard deviation upward move of the strike price of the first option and, in response to the standard deviation upward move of the strike price being higher than the highest strike price, selecting the standard deviation upward move of the strike price as the highest strike price. In other features, the identifying the highest strike price of the first option includes determining a standard deviation downward move of the strike price of the first option and, in response to the standard deviation downward move of the strike price being lower than the lowest strike price, selecting the standard deviation downward move of the strike price as the lowest strike price.

In other features, the determining the vertical axis range includes identifying a highest value of the projected price of the first option, identifying a lowest value of the projected price of the first option, and setting the vertical axis range to the identified lowest value less the buffer value and the identified highest value plus the buffer value. In other features, the method includes storing a stock and option parameter database including a plurality of options and each option of the plurality of options includes a corresponding stock symbol, a value, and an expiration date. In other features, the method includes obtaining the option data corresponding to the option from the stock and option parameter database. In other features, the method includes updating the pre-loaded database in response to the horizontal axis range being determined.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
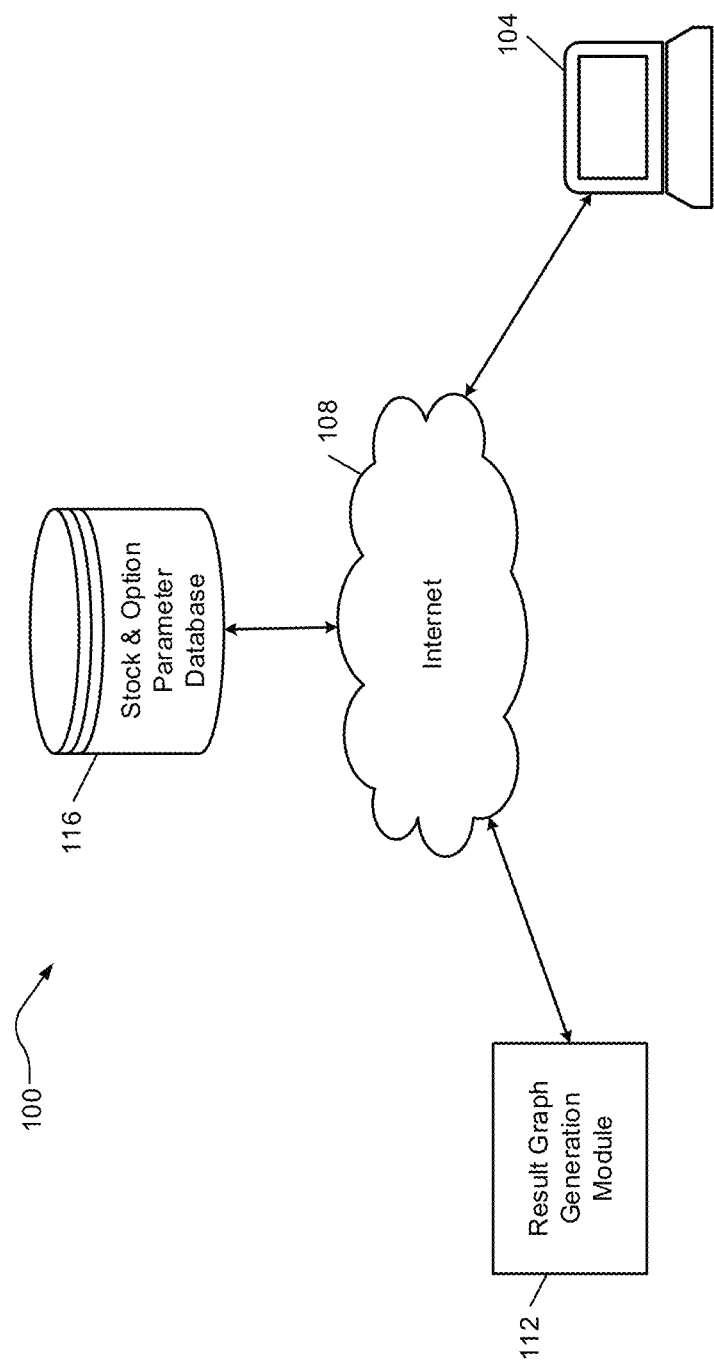
FIG. 1 is a high-level example block diagram of a result graph generation system according to the principles of the present disclosure.

A result graph generation system provides an interactive experience for a user to visualize a variety of options and more easily determine an amount of risk the option poses based on the graphed profit and loss values. To encourage users to engage in option trading, the result generation system generates graphs for user-selected stock options based on a strike price or option. The strike price is adjustable using a movable option pill that a user can drag along a horizontal axis of a result graph.

A result graph, also known as a profit-loss diagram or a risk graph, is a two-dimensional graphical representation that displays the range of profit or loss possibilities for an options trade. The horizontal axis represents the price of the underlying security at expiration and the vertical axis represents the potential profit or loss. Result graphs provide an easy way to understand and visualize the effects of what may happen to an option under various situations and indicate to a user a price at which the option realizes a maximum profit or a maximum loss along with where the corresponding stock is in the profit and loss spectrum. Result graphs can be drawn to show the potential payoffs for single options as well as for spreads or combination strategies. Result graphs can also be constructed for short positions or for complex strategies such as butterflies, straddle, condors, or vertical spreads.

For active traders and novice investors alike, result graphs are simple tools that help investors understand and analyze option strategies before investing. The result graph shows the profit potential, risk potential, and breakeven point of a potential option trade. There are an extremely high number of potential options trades that a user can select and the specific layout of a result graph allows for users to quickly ascertain key details of an options trade. Even in comparison to simple buying and selling of securities, options trades are extremely time sensitive, so the speed at which result graphs are delivered to users is paramount.

Users of result graphs will often want to adjust the price of the options trade or alter the option being viewed, which will result in the result graph being re-drawn or re-rendered. Users are also accustomed to seeing the result graph with a particular aspect ratio that allows for visual comparison between two or more options trades. However, as the price of the options trade changes, the scales of the vertical and horizontal axes of the result graph will change. The present disclosure is directed towards maintaining a consistent aspect ratio of the result graph without frequent re-drawing or re-rendering of the result graph while correctly accounting for and analyzing rolling trades with existing positions.

The disclosure further improves performance of a result graph by ensuring that re-renders and recalculations of the result graph are not triggered on market data updates and instead simply adjust the current graph according to market updates. The movable option pill also allows users to see how adjusting strike prices adjusts profits and losses. Adjusting the movable option pill automatically selects an option contract with a corresponding strike price for the user to view.

Block Diagram

Referring to FIG. 1, a high-level example block diagram of a result graph generation system 100 is shown. A user device 104, such as a computer, tablet, mobile phone, etc., can connect to the Internet 108 to access a result graph generation module 112. The result graph generation module 112 receives user input from a user operating the user device 104 via the Internet 108 as well as stock and option parameter data from a stock & option parameter database 116 connected to the result graph generation module 112 via the Internet 108. The user input includes a stock identifier and a strike price or a selected option. In various implementations, the stock identifier may be a stock that the user owns.

Once the user inputs the stock identifier and the strike price or option, the result graph generation system 100 can obtain a set of options for the stock identifier at a plurality of strike prices and store or pre-load associated option data for the set of options of the stock identifier. Then, the result graph generation system 100 presents, on a user interface, a result graph depicting the potential profit and loss at a variety of stock prices of the selected option or an option identified based on the input strike price. To determine the profit and loss of the option across the variety of stock prices for the corresponding strike price, the result graph generation module 112 uses the Black-Scholes pricing model to determine a projected price of the option at the variety of stock prices.

Further, the result graph generation module 112 subtracts the original cost of the options from the projected prices to determine the profit or loss at the variety of stock prices along the horizontal axis. The Black-Scholes pricing model determines the projected price of the variety of stock prices using the corresponding strike price, the expiration date of the option, and the implied volatility of the option contract, all of which is stored, for each option, in the stock & option parameter database 116.

As is described in more detail below, since the set of options for the stock identifier at a plurality of strike prices are pre-loaded, the result graph generation module 112 can update and graph the profit and loss of a variety of options at different strike prices without needing to access remote data. For example, on the result graph, the user interface may include a user interface element along the horizontal axis that is movable, to adjust the strike price. In response to moving the user interface element, the result graph generation module 112 selects a new option, already pre-loaded or stored, based on the adjusted strike price for graphing.

Example User Interfaces

Figure 2:
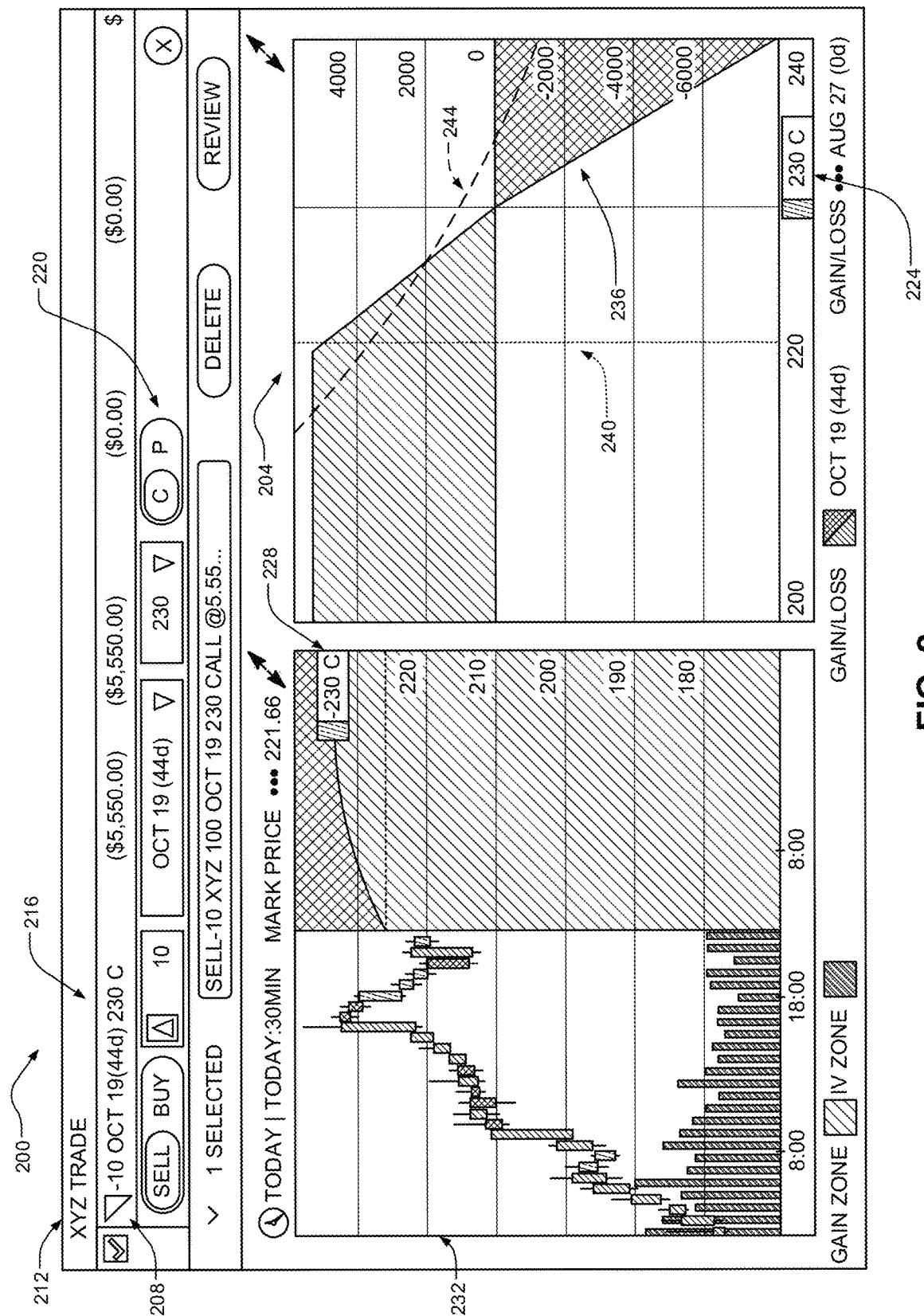
FIG. 2 is a representation of an example user interface presenting an example result graph of an option according to the principles of the present disclosure.

Referring to FIG. 2, a representation of an example user interface 200 presenting an example result graph 204 of an option 208 is shown. As described above, the user may input through a graphical user interface or user device application a stock identifier 212, in this case XYZ, and a strike price 216, in this case 230. In various implementations, instead of the user inputting a particular strike price 216, the user may selected the option 208, which has a set strike price. While these variables may also have a default setting, the user may also input a call or put option as well as input an expiration date range. As shown, the user may switch on the example user interface from the default call to a put via a first switch 220. The result graph 204 depicts along the horizontal axis a range of stock prices of the XYZ stock and along the vertical axis a value representing a profit or loss of the option 208 at the corresponding stock price.

As mentioned previously, the result graph determination system selects the option 208 based on the strike price 216 input by the user. The strike price 216 is included on the result graph 204 as an option pill 224, which is a movable user interface element. The user can slide the option pill 224 along the horizontal axis to select a new strike price. When slid, a price pill 228 also moves along a vertical axis of a daily stock performance graph 232, displayed next to the result graph 204. The daily stock performance graph 232 displays how the stock identifier 212 or security has been performing throughout the day to indicate to the user how the stock may be expected to perform. The daily stock performance graph 232 has prices along the vertical axis and time along the horizontal axis.

Returning to the result graph 204, the horizontal axis includes a range of 200 to 240, which represents the price of the stock identifier 212 at expiration. The vertical axis ranges from −8,000 to 6,000, depicting a value of profit or loss. The user interface 200 may include selectable parameters that can adjust the displayed result graph, including a buy/sell user-selectable button, an expiration date field, and a current price field.

A user can view the result graph 204 on the user interface 200 and determine the amount of profit or loss the user is exposed to using a result line 236, which is based on the stock price that the option 208 could be at the expiration of the option. A current price line 240 illustrates a present price of the stock identifier 212. A daily result line 244 represents a daily profit and loss.

The result graph 204 provides a user-friendly display for users to easily identify potential profits and gains. To include the range of expiration prices as well as profit and loss amounts, it is important to determine a suitable horizontal axis and vertical axis to display the relevant information to the user. Both axes are determined based on the option for display for the stock identifier input by the user.

Figure 3:
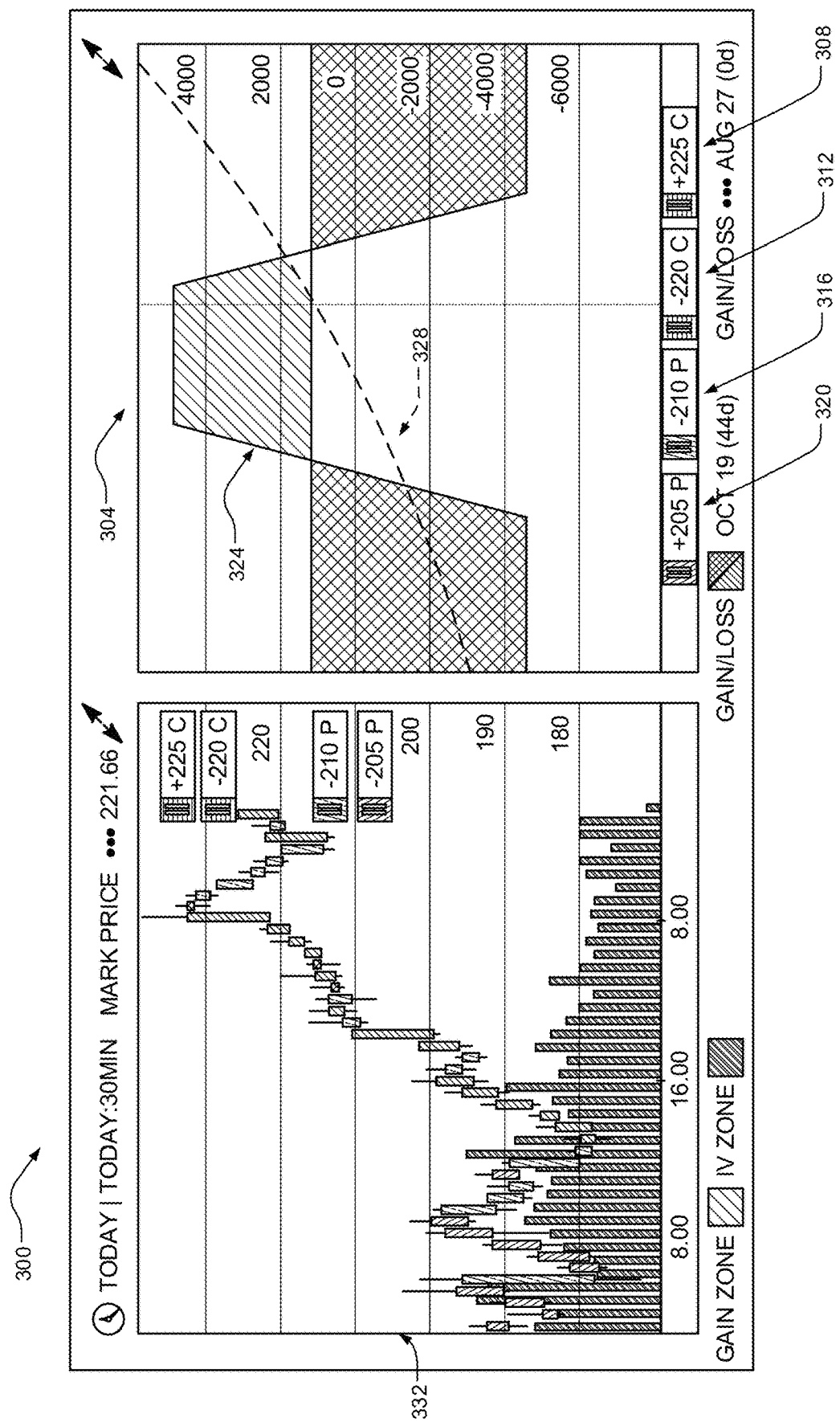
FIG. 3 is a representation of an example user interface presenting an example result graph of a group of options according to the principles of the present disclosure.

Referring to FIG. 3, a representation of an example user interface 300 presenting an example result graph 304 of a group of options is shown. The group of options depicted in FIG. 3 represents an iron condor including four option contracts. For example, the result graph 304 displays four option pills, a first pill 308 representing a purchase of a call at a price of 225, a second pill 312 representing a sale of a call at a price of 220, a third pill 316 representing a sale of a put at a price of 210, and a fourth pill 320 representing a sale of a call at a price of 205. The result graph 304 displays a result line 324 depicting a maximum gain within a particular price window (showing a gain occurring between a stock price of about 210 to 220) and maximum losses outside the particular price window. A daily result line 328 represents the profit and loss today, if the options were sold at the corresponding stock price.

Next to the results graph 304 is a daily stock performance graph 332 depicting the stock price throughout the day. As with the option pill of FIG. 2, the four options pills can be dragged and the result graph 304 updated accordingly, without lag, since, upon generating the result graph 304, the result graph generation system pre-loads options for the stock identifier or security at the strike prices along the horizontal axis of the result graph 304. In various implementations, multiple pills may be selected and dragged together.

Generation System Diagram

Figure 4:
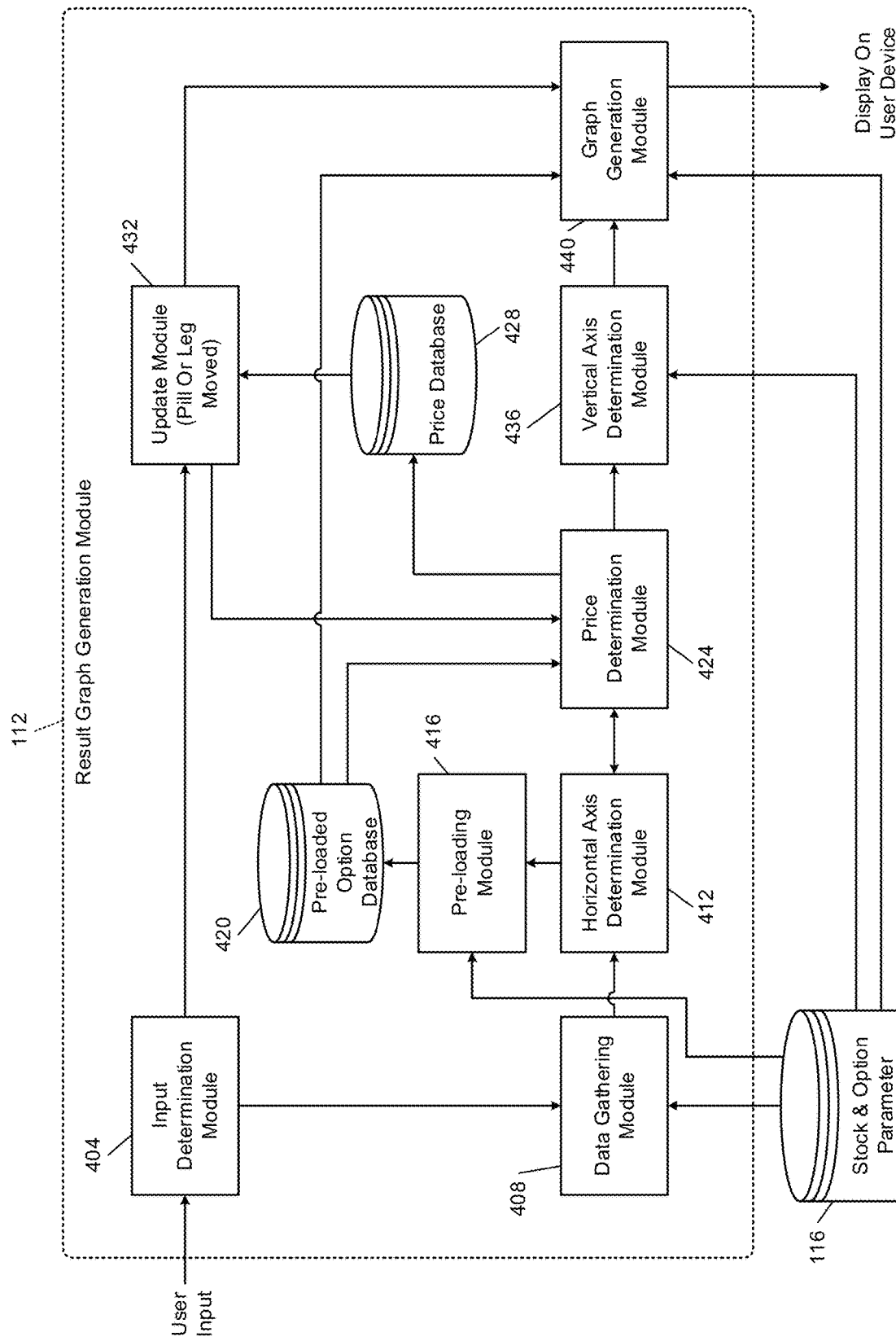
FIG. 4 is a functional block diagram of an example result graph generation module according to principles of the present disclosure.

Referring to FIG. 4, a functional block diagram of an example result graph generation module is shown. The result graph generation module 112 includes an input determination module 404 for receiving user input. The user input may include a stock selection, strike price, strike price update, and/or an option leg selection update. As shown in the iron condor of FIG. 3, multiple option legs of the stock can be selected and displayed on a result graph, the result line being an overall profit or loss of the sum of the selected option leg.

The input determination module 404 determines whether a new result graph is being generated or whether a present result graph is being updated or adjusted. If the input determination module 404 determines that a new result graph is being generated, the user input is forwarded to a data gathering module 408. The data gathering module 408 obtains stock and option data from the stock & option parameter database 116 to calculate projected or theoretical prices of the stock for the option included in the user input according to the Black-Scholes pricing model. The data collected includes a present stock price and option contract data, including a strike price, an expiration data, and an implied volatility of the option.

The data gathering module 408 forwards the collected data to a horizontal axis determination module 412. The horizontal axis determination module 412 is configured to determine a range of the horizontal axis based on the likely range of prices of the stock of the selected option contract, described in detail in FIG. 5, with a buffer on the upper and lower limits. In various implementations, the horizontal axis determination module 412 may obtain the stock and option data directly from the stock & option parameter database 116. Once the horizontal axis is determined, the horizontal axis determination module 412 forwards the horizontal axis range to a pre-loading module 416. The pre-loading module 416 obtains option data for options of the input stock identifier that have a strike price within the horizontal axis range from the stock & option parameter database 116. The pre-loading module 416 loads the obtained option data to a pre-loaded option database 420.

The horizontal axis determination module 412 also forwards the horizontal axis range to a price determination module 424. The price determination module 424 calculates a projected or theoretical price of the selected options at each stock price along the horizontal axis range using the Black-Scholes pricing model. The projected prices of the selected options at the stock prices along the horizontal axis are stored in a price database 428. The price determination module also calculates an original price of the option. Then, the profit or loss can be later calculated from the difference between the projected prices along the horizontal axis less the original price of the corresponding option. The original price of the option is also stored in the price database 428.

Then, if a user is interacting with the user interface of FIG. 3 and is removing one leg of the iron condor, the input determination module 404 can forward the user input to an update module 432 and obtain the already calculated projected prices (which would not change) from the price database 428. In this way, the projected price calculations do not need to be redone and the update module 432 can simply remove the subtraction of the original price of option leg being removed.

The price determination module 424 forwards the calculated projected prices to a vertical axis determination module 436. Similar to the horizontal axis determination module 412, the vertical axis determination module 436 determines a vertical axis range based on the range of projected profits and losses, including a buffer on the upper and lower limit, described in detail in FIG. 6. The horizontal axis range, the vertical axis range, and prices (original and projected) are forwarded to a graph generation module 440. The graph generation module 440 sets the horizontal axis and the vertical axis based on the determined horizontal axis range and the determined vertical axis range. The graph generation module 440 also graphs a result line as the projected priced at each stock price of the horizontal axis less the original cost of the option.

If the input determination module 404 receives user input in the form of a moved option pill along the horizontal axis, the update module 432 determines a new strike price based on the position of the option pill. Then, the update module 432 forwards the new strike price to the price determination module 424, which identifies, based on the new strike price, a new option with the new strike price that is stored in the pre-loading module 416. The price determination module 424 calculates the projected prices along the horizontal axis for the new option and a new original cost of the new option, which are then stored in the price database 428. Then, the price determination module 424 forwards the new option calculations to the vertical axis determination module 436 to update the vertical axis. The updated calculations and vertical axis are forwarded to the graph generation module 440, which updates the result graph displayed on the user interface of the user device.

In various implementations, if the user adds or removes options legs to the result graph, the update module 432 instructs a price update by the price determination module 424. Then, if the update adds or removes a leg, the price determination module 424 can instruct the update of the horizontal axis by the horizontal axis determination module 412 and the vertical axis by the vertical axis determination module 436. Updating the horizontal axis also instructs the pre-loading module 416 to obtain and replace the option data stored in the pre-loaded option database 420 with option data corresponding to values of the updated horizontal axis. In various implementations, a similar update may occur after moving the option pill.

Flowcharts

Figure 5A:
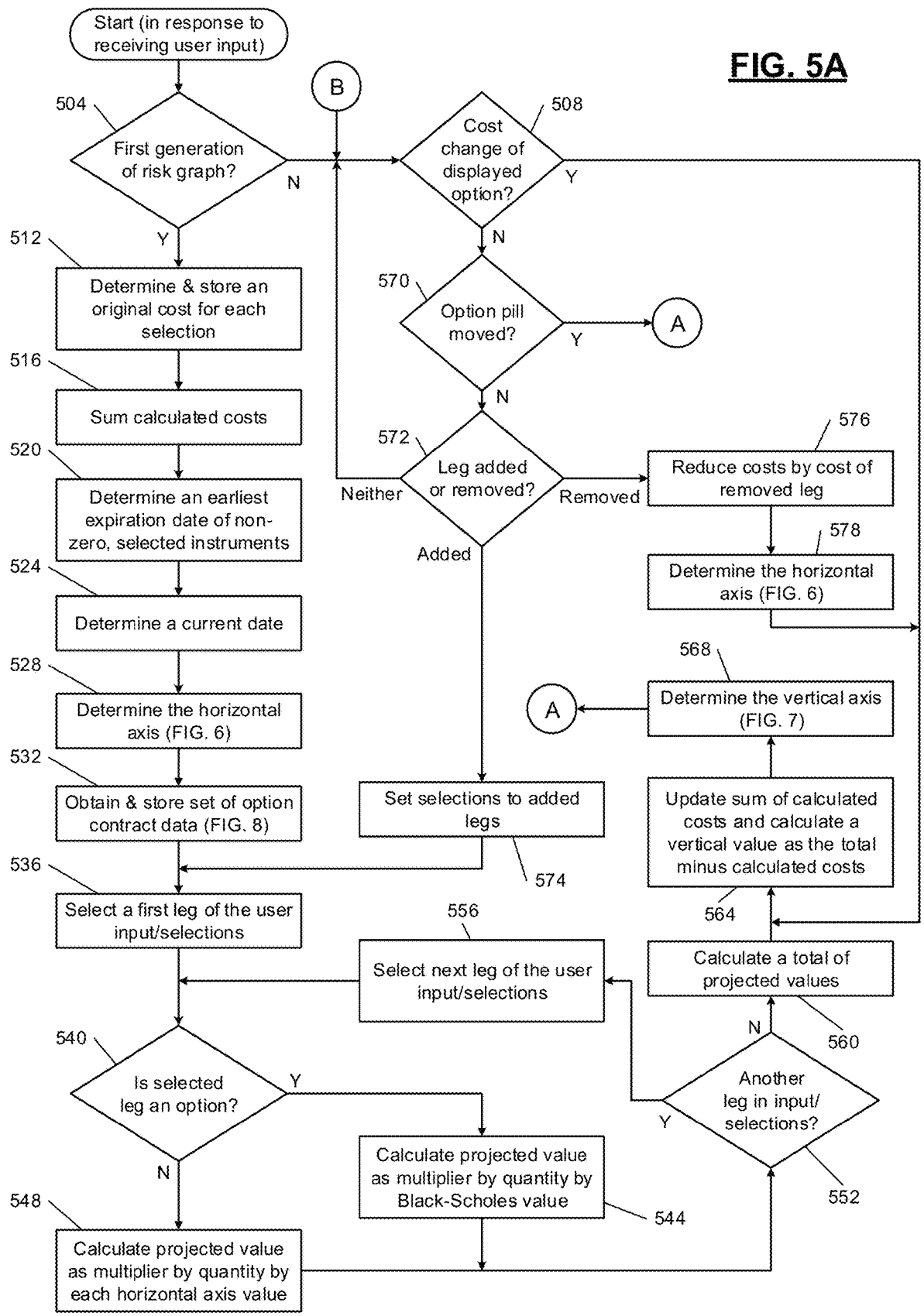
FIGS. 5A and 5B together are a flowchart depicting example result graph generation according to the principles of the present disclosure.
Figure 5B:
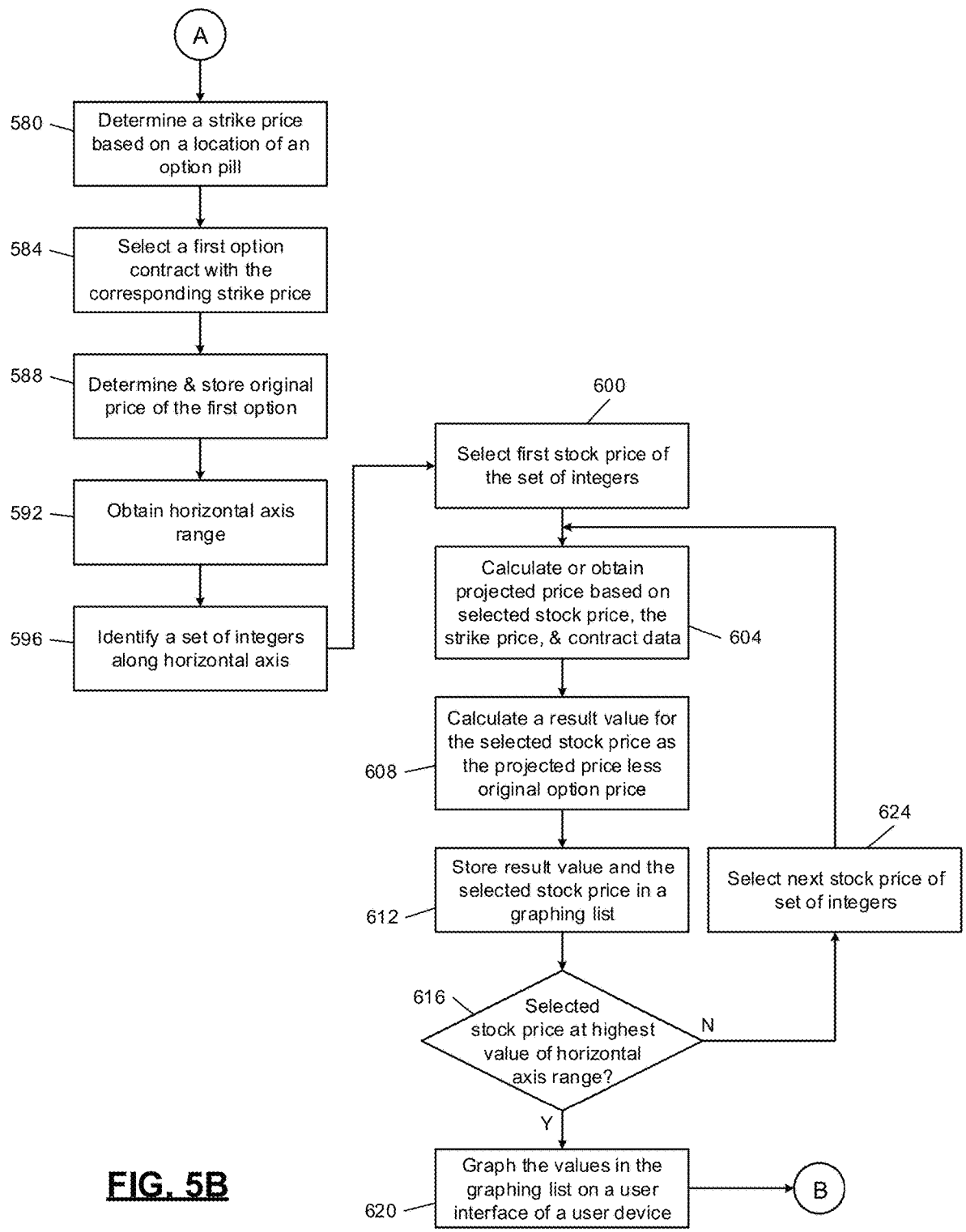

Referring to FIGS. 5A and 5B, flowcharts depicting example result graph generation is shown. Control begins in response to receiving user input. The user input may include a stock identifier and a selection of an option or a strike price with a corresponding option at the strike price. For example, on the user interface of FIG. 2, a user may select a particular option to display in result graph form. When first generating a graph, a set of values need to be determined.

However, after an original generation and display, adjustment of option legs, for example, addition or removal of a leg, or moving of an option pill does not require generation of an entirely new graph. Similarly, the change in the cost of one leg or all legs, does not need a new graph, simply adjustment of the existing graph. Since the result graph does not need to be regenerated and option data used to update the option selection is pre-loaded, user experience is improved by reducing use of computer resources resulting in a faster user interface update.

After receiving the user input, control continues to 504 to determine whether the user input indicates a generation of a result graph for the first time. If no, control continues to 508 to determine if a cost of the selected option has changed. For example, if a cost of the option is updated. Otherwise, control proceeds to 512 to determine and store an original cost for each selection, for example, the original purchase cost of a selected option. Each selection may include a draft/simulated trade, working order, or position. Control continues to 516 to sum the calculated costs. At 520, control determines an earliest expiration date of non-zero, selected instruments. Control continues to 524 to determine a current date. In various implementations, the user may enter an alternative date as the current date.

Figure 6:
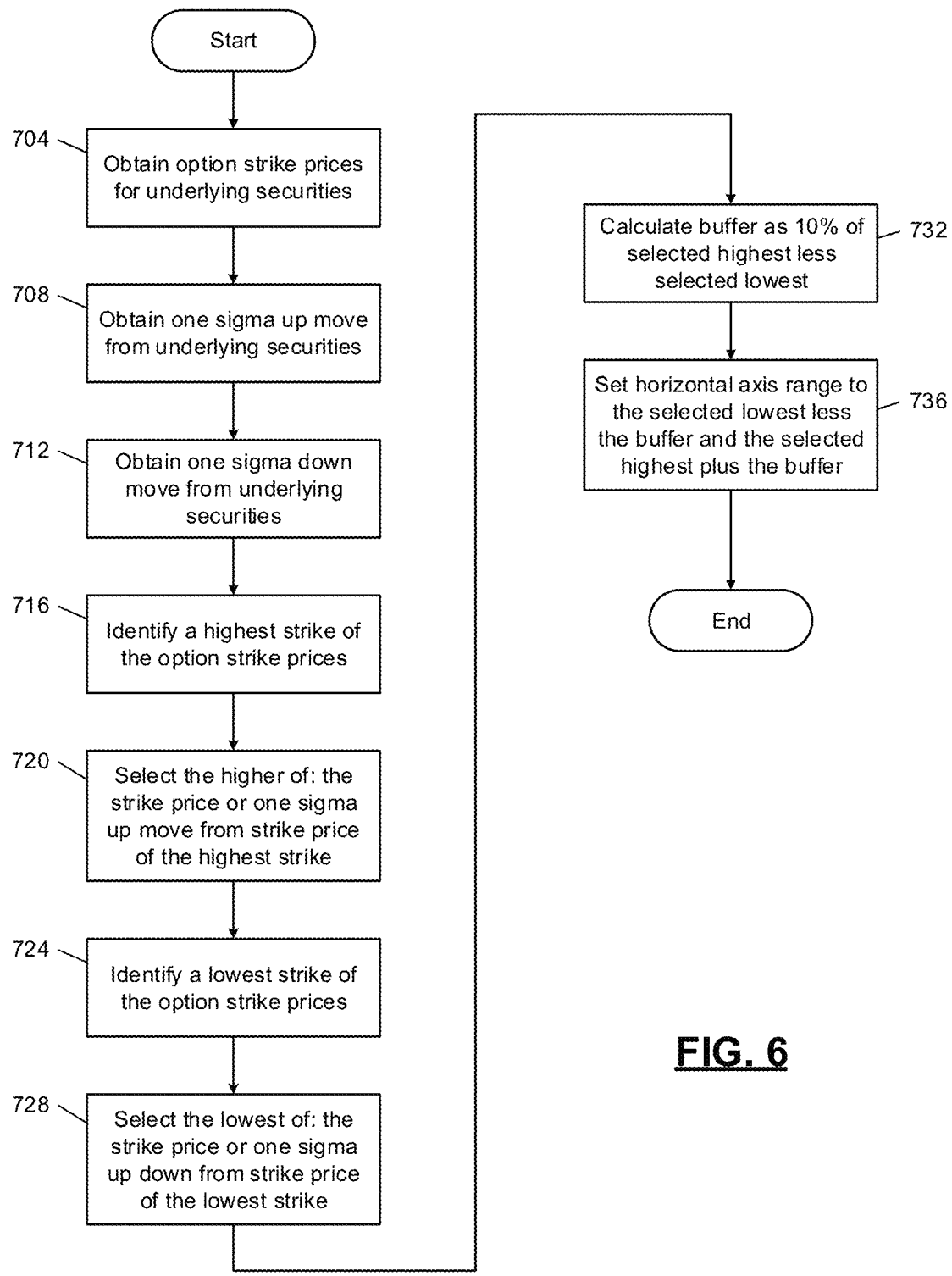
FIG. 6 is a flowchart depicting example horizontal axis determination of a result graph according to the principles of the present disclosure.

Then, control proceeds to 528 to determine the horizontal axis, as described in FIG. 6. Control continues to 532 to obtain a set of option contract data based on the horizontal axis range determined at 528. In various implementations, control may obtain option contract data for the stock identifier. In this way, control can update the horizontal axis range as according to the selected options and changes to the strike price and have all option data pre-loaded. The obtained set of contract data is stored for control to access later if an option or strike price is updated by the user by moving the option pill displayed on the result graph. Additional description regarding obtaining the set of option contract data is described in FIG. 8.

Then, control proceeds to 536 to select a first leg of the user input or the selections on the user interface. At 540, control determines if the selected leg is an option. If yes, control calculates a projected or theoretical value using the Black-Scholes pricing model at 544. Control determines the overall projected price including a multiplier of the selected option (representing a total premium paid) and a quantity of the selected option (representing a number of options that are purchased in a set).

Otherwise, if the selected leg is not an option, then control proceeds to 548 to calculate the theoretical value as the multiplier by the quantity by the cost of the stock. In various implementations, the result graph does not include the ability to graph a stock position (non-option) since the result graph is generated to illustrate potential risk when purchasing an option.

Then, after either step 544 or 548, control continues to 552 to determine whether another leg is selected or included in the user input. That is, in the case of generating a result graph for an iron condor, four options would be selected or included in the user input. If yes, control continues to 556 to select a next leg of the user input or selections and returns to 540. Otherwise, control proceeds to 560 to calculate a total of the calculated projected values. Control continues to 564 to update the sum of calculated costs and calculate a vertical value as the total projected values minus the sum of calculated costs. Then, at 568, control determines and sets the vertical axis as described in FIG. 7. Then, control continues to FIG. 5B to graph the result graph on a user interface.

Returning to 504, if control determines that the user input does not indicate generation of a first result graph, then, at 508, control determines whether the user input is updating a cost of the displayed option of one of the selections. In this way, the user input may be selecting a refresh button to update the cost of selected options. In various implementations, the result graph can automatically update when a change in cost occurs to a stock or an option. If yes, control proceeds to 564 to update the sum of calculated costs and calculate a vertical value as the total projected values minus the sum of calculated costs. Otherwise, if the update is not a cost change, then control proceeds to 570 to determine whether an option pill on the user interface of the result graph was moved. If yes, control proceeds to FIG. 5B. Otherwise, control continues to 572.

At 572, control determines if a leg was added or removed. If no, control returns to 508 to wait for an update or change to the result graph. If a leg was added, control proceeds to 574 to set the selections equal to the added legs. Then, control returns to 536 to calculate the projected value of the added legs. Otherwise, if a leg was removed, control continues to 576 to calculate the sum of calculated costs as the sum of the calculated costs less the cost of the removed leg. Then, control determines the horizontal axis at 578 as described in FIG. 6 using the updated sum. Then, control returns to 564 to update the vertical axis due to the removed legs.

Continuing to FIG. 5B, if control determines that the user input is moving the option pill, control proceeds to 580 to determine a strike price based on a location of the moved option pill. Since the option pill is moved, control identifies a new option corresponding to the new strike price. In this way, the user can visualize the options available at varying strike prices, using pre-loaded data, to quickly and easily analyze the risk involved with options set at different strike prices for the stock identifier.

Control continues to 584 to select a first option contract with the corresponding strike price. The first option contract is selected from the set of options previously stored at 532 of FIG. 5A. At 588, control determines an original price of the first option. The original price is the cost of purchasing the option contract. Control proceeds to 592 to obtain the horizontal axis range previously determined at 528 or 578 of FIG. 5A. At 596, control identifies a set of integers (stock prices) along the horizontal axis. Control continues to 600 to select a first stock price or first, lowest integer of the set of integers.

Control proceeds to 604 to calculate or obtain a projected price using the Black-Scholes pricing model, which is based on the selected stock price, the strike price, and contract data that was pre-loaded. In various implementations, the projected prices of a particular option may have previously been calculated and stored in FIG. 5A; therefore, control would obtain the previously stored values instead of recalculating them. Control continues to 608 to calculate a result value for the selected stock price as the projected price less the original option price.

Control continues to 612 to store the result value and the selected stock price in a graphing list. At 616, control determines if the selected stock price is at a highest value of the horizontal axis range, meaning each stock price along the horizontal axis has been calculated. If yes, control proceeds to 620 to graph the values included in the graphing list. Then, once the result graph is graphed on a user interface of a user device, control returns to 508 of FIG. 5A to wait for another update or change. Returning to 616, if the selected stock price is not at the highest value of the horizontal axis, control proceeds to 624 to select a next stock price of the set of integers and returns to 604.

Referring to FIG. 6, a flowchart depicting example horizontal axis determination of a result graph is shown. Control begins at 704 and obtains all option strikes for the underlying securities, which is the fixed price at which the user can purchase or sell the option or underlying security for a period of time (until the set expiration date). Control continues to 708 to also obtain one sigma (the volatility of the option implied by the strike price) up move from the underlying securities (that is, the options or stocks included in the user input or selected on the user interface) and then continues to 712 to obtain one sigma down move from the underlying securities.

The one sigma up move and one sigma down move are used to scale the graph based on the current price of the underlying securities. In various implementations, an alternative measurements or key points may be identified to scale the graph to display relevant or desirable data. For example, in the absence of any strike prices that can be used to size the graph, a 10% up move and 10% down move from the current price of the underlying security may be used.

At 716, control identifies a highest strike of the option strike prices. At 720, control selects the higher of (1) the strike price or (2) one sigma up move from the strike price of the highest strike. Then, at 724, control identifies a lowest strike of the option strike prices. At 728, control selects the lowest of (1) the strike price or (2) one sigma down move from the strike price of the lowest strike. Control proceeds to 732 to calculate a buffer as 10% of the selected highest less the selected lowest. At 736, control sets the horizontal axis range to the selected lowest less the buffer and the selected highest plus the buffer.

In other words, VAR 1 is the lowest of all strikes, mark price, or −1 standard deviation expected move from mark price. Then, VAR 2 is the highest of all strikes, mark price, or +1 standard deviation expected move from mark price. The expected move is a mark of the underlying * volatility index of the underlying * square root of (milliseconds to expiration/milliseconds in a year). Then, to determine the lower end of the horizontal axis, control determines VAR 1−(VAR 2−VAR 1)*0.10. Then, to determine the upper end of the horizontal axis, control determines VAR 2+(VAR 2−VAR 1)*.10. Then, control ends.

Figure 7:
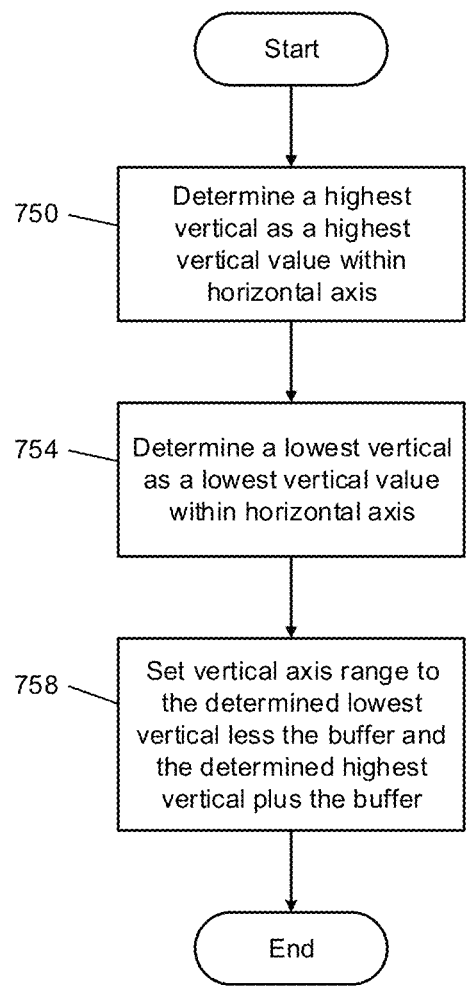
FIG. 7 is a flowchart depicting example vertical axis determination of a result graph according to the principles of the present disclosure.

Referring to FIG. 7, a flowchart depicting example vertical axis determination of a result graph is shown. Control begins at 750 to determine a highest vertical as a highest vertical value within the horizontal axis (determined in FIG. 6). Control proceeds to 754 to determine a lowest vertical as a lowest vertical value within the horizontal axis. Then, control continues to 758 to set the vertical axis range to the determined lowest vertical less the buffer and the determined highest vertical plus the buffer. Then, control ends.

In other words, VAR 1 is the highest vertical axis value and VAR 2 is the lowest vertical axis value. Then, the lower end of the vertical axis is VAR 1−(VAR 2−VAR 1)*0.10. Similarly, the upper end of the y axis is VAR 2+(VAR 2−VAR 1)*0.10.

Figure 8:
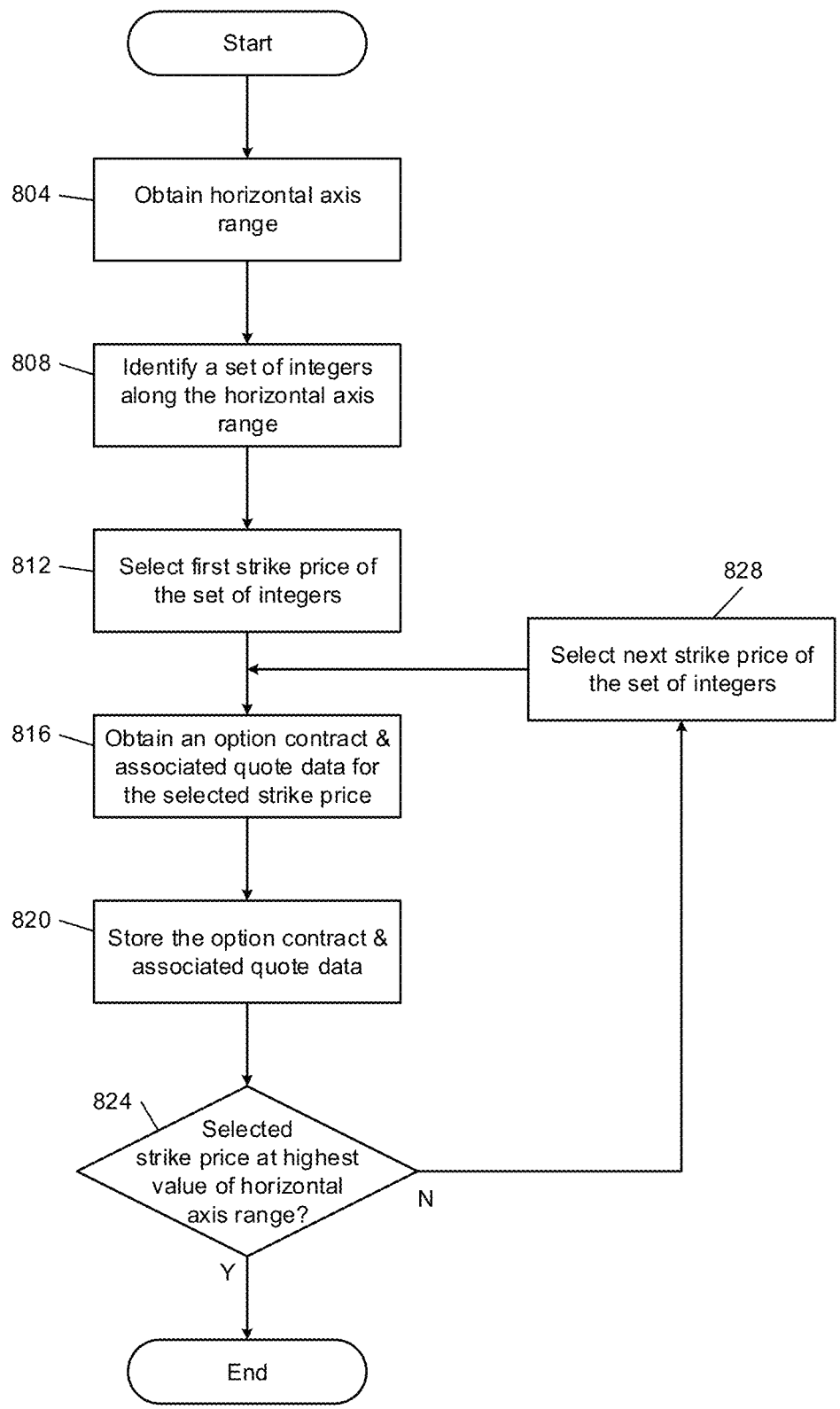
FIG. 8 is a flowchart depicting example options determination according to the principles of the present disclosure.

Referring to FIG. 8, a flowchart depicting example options determination is shown. Control begins at 804 to obtain the horizontal axis range determined in FIG. 6. Control continues to 808 to identify a set of integers along the horizontal axis range (representing the underlying stock price). Then, control continues to 812 to select a first strike price of the set of integers. Control proceeds to 816 to obtain an option contract and associated quote data for the selected strike price.

Control continues to 820 to store the option contract and associated quote. Then, the data is pre-loaded so that when an update to the option pill occurs on the result graph, control does not need to obtain additional data external to the result generation system. Control proceeds to 524 to determine if the selected strike price is at a highest value of the horizontal axis range, meaning option contracts have been obtained for each integer along the horizontal axis range. If yes, control ends. Otherwise, control continues to 828 to select a next strike price of the set of integers and returns to 816.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
   processor hardware and
   memory hardware coupled to the processor hardware,
   wherein the memory hardware stores:
     a first database configured to store option data for a range of strike prices and
     instructions for execution by the processor hardware,
   wherein the instructions include, in response to receiving user input for a result graph request including a stock identifier and an option identifier from a user device:
     determining a first horizontal axis range and a first vertical axis range based on the stock identifier and the option identifier, wherein:
       the first horizontal axis range includes a range of integers and indicates a strike price for the option and
       the first vertical axis range indicates at least one of profit or loss for the option;
     for each integer within the first horizontal axis range, obtaining, from a second database, option data and storing the option data from the second database in the first database, such that the option data is pre-loaded in the first database, wherein the option data corresponds to an option for the stock identifier that has a strike price set to the corresponding integer;
     receiving a first location of a movable user interface element, wherein the first location of the movable user interface element corresponds to a point along the first horizontal axis range;
     identifying a first strike price based on the first location of the movable user interface element;
     obtaining, from the first database, a first option based on the first strike price;
     for each integer of the first horizontal axis range, determining a result value of the first option based on a projected price of the first option at which a value of a stock corresponding to the stock identifier equals the corresponding integer;

plotting, on a result graph, the result value for each integer of the first horizontal axis range; and in response to the movable user interface element being moved to a second location corresponding to a point along the first horizontal axis range, updating the result graph by performing the receiving, identifying, obtaining, determining, and plotting steps based on the second location, and wherein the instructions include, in connection with the updating:

determining a second horizontal axis range for the updated result graph;

determining whether the second horizontal range is different from the first horizontal axis range; and in response to a determination that the second horizontal range is different from the first horizontal axis range, re-loading the first database with updated option data for the range of strike prices from the second database, such that the instructions cause the processor hardware to use the updated option data to update the result graph in response to the movable user interface element being moved to the second location.

2. The system of claim 1 wherein the result value is the projected price of the first option at which the value of the stock corresponding to the stock identifier equals the corresponding integer less an original price of the first option.

3. The system of claim 1 wherein the determining the first horizontal axis range includes:
identifying a highest strike price of the first option;
identifying a lowest strike price of the first option;
calculating a buffer value; and
setting the first horizontal axis range to the lowest strike price less the buffer value and the highest strike price plus the buffer value.

4. The system of claim 3 wherein the buffer value is equal to ten percent of the identified highest strike price of the first option less the identified lowest strike price of the first option.

5. The system of claim 3 wherein the identifying the highest strike price of the first option includes:
determining a standard deviation upward move of the strike price of the first option and in response to the standard deviation upward move of the strike price being higher than the highest strike price, selecting the standard deviation upward move of the strike price as the highest strike price.

6. The system of claim 3 wherein the identifying the highest strike price of the first option includes:
determining a standard deviation downward move of the strike price of the first option and
in response to the standard deviation downward move of the strike price being lower than the lowest strike price, selecting the standard deviation downward move of the strike price as the lowest strike price.

7. The system of claim 1 wherein the determining the first vertical axis range includes:
identifying a highest value of the projected price of the first option;
identifying a lowest value of the projected price of the first option; and
setting the first vertical axis range to the identified lowest value less a buffer value and the identified highest value plus the buffer value.

8. The system of claim 1 wherein:
the memory hardware stores a stock and option parameter database including a plurality of options and each option of the plurality of options includes a corresponding stock symbol, a value, and an expiration date.

9. The system of claim 8 wherein:
the instructions include obtaining the option data corresponding to the option from the stock and option parameter database.

10. A method comprising:
receiving user input for a result graph request including a stock identifier and an option identifier from a user device;
determining a first horizontal axis range and a first vertical axis range based on the stock identifier and the option identifier, wherein:
the first horizontal axis range includes a range of integers and indicates a strike price for the option and
first vertical axis range indicates at least one of profit or loss for the option;
for each integer within the first horizontal axis range, obtaining and storing option data corresponding to an option for the stock identifier in a first database that has a strike price set to the corresponding integer, wherein the first database includes option data for a range of strike prices, and wherein the option data is obtained from a second database and pre-loaded in the first database;
receiving a first location of a movable user interface element, wherein the first location of the movable user interface element corresponds to a point along the first horizontal axis range;
identifying a first strike price based on the first location of the movable user interface element;
obtaining, from the first database, a first option based on the first strike price;
for each integer of the first horizontal axis range, determining a result value of the first option based on a projected price of the first option at which a value of a stock corresponding to the stock identifier equals the corresponding integer;
plotting, on a result graph, the result value for each integer of the first horizontal axis range; and
in response to the movable user interface element being moved to a second location corresponding to a point along the first horizontal axis range, updating the result graph by performing the receiving, identifying, obtaining, determining, and plotting steps based on the second location,
wherein the updating includes:
determining a second horizontal axis range for the updated result graph and
in response to a determination that the second horizontal range is different from the first horizontal axis range, re-loading the first database with updated option data for the range of strike prices from the second database, such that the updated option data is used to update the result graph in response to the movable user interface element being moved to the second location.

11. The method of claim 10 wherein the result value is the projected price of the first option at which the value of the stock corresponding to the stock identifier equals the corresponding integer less an original price of the first option.

12. The method of claim 10 wherein the determining the first horizontal axis range includes:
identifying a highest strike price of the first option;
identifying a lowest strike price of the first option;
calculating a buffer value; and setting the first horizontal axis range to the lowest strike price less the buffer value and the highest strike price plus the buffer value.

13. The method of claim 12 wherein the buffer value is equal to ten percent of the identified highest strike price of the first option less the identified lowest strike price of the first option.

14. The method of claim 12 wherein the identifying the highest strike price of the first option includes:
   determining a standard deviation upward move of the strike price of the first option; and
   in response to the standard deviation upward move of the strike price being higher than the highest strike price, selecting the standard deviation upward move of the strike price as the highest strike price.

15. The method of claim 12 wherein the identifying the highest strike price of the first option includes:
   determining a standard deviation downward move of the strike price of the first option; and
   in response to the standard deviation downward move of the strike price being lower than the lowest strike price, selecting the standard deviation downward move of the strike price as the lowest strike price.

16. The method of claim 10 wherein the determining the first vertical axis range includes:
   identifying a highest value of the projected price of the first option;
   identifying a lowest value of the projected price of the first option; and
   setting the first vertical axis range to the identified lowest value less a buffer value and the identified highest value plus the buffer value.

17. The method of claim 10 further comprising:
   storing a stock and option parameter database including a plurality of options,
   wherein each option of the plurality of options includes a corresponding stock symbol, a value, and an expiration date.

18. The method of claim 17 further comprising:
   obtaining the option data corresponding to the option from the stock and option parameter database.

* * * * *